US009268610B2

(12) United States Patent
Hegdal et al.

(10) Patent No.: US 9,268,610 B2
(45) Date of Patent: Feb. 23, 2016

(54) RAPID VIRTUAL MACHINE CLONING

(71) Applicant: VMware, Inc., Palo Alto, CA (US)

(72) Inventors: Gururaja Hegdal, Bangalore (IN); Kiran Kasala, Bangalore (IN); Marichetty M.S., Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/069,646

(22) Filed: Nov. 1, 2013

(65) Prior Publication Data
US 2015/0127833 A1    May 7, 2015

(51) Int. Cl.
| | | |
|---|---|---|
| *G06F 15/173* | (2006.01) | |
| *G06F 9/50* | (2006.01) | |
| *H04L 29/08* | (2006.01) | |
| *H04L 29/06* | (2006.01) | |
| *G06F 3/06* | (2006.01) | |
| *G06F 9/455* | (2006.01) | |
| *G06F 9/48* | (2006.01) | |

(52) U.S. Cl.
CPC .......... *G06F 9/5016* (2013.01); *H04L 67/1097* (2013.01); *H04L 67/34* (2013.01); *H04L 67/38* (2013.01); *G06F 3/065* (2013.01); *G06F 9/45533* (2013.01); *G06F 9/4856* (2013.01)

(58) Field of Classification Search
CPC .... G06F 9/45533; G06F 9/4856; G06F 3/065
USPC ................................................ 709/226; 718/1
See application file for complete search history.

(56) References Cited

U.S. PATENT DOCUMENTS

| | | | |
|---|---|---|---|
| 8,490,092 B2 * | 7/2013 | Reuther et al. .................... 718/1 |
| 2008/0098154 A1 * | 4/2008 | Traut et al. ........................ 711/6 |
| 2011/0010515 A1 * | 1/2011 | Ranade .......................... 711/162 |
| 2012/0331462 A1 * | 12/2012 | Falko ................................ 718/1 |
| 2014/0229936 A1 * | 8/2014 | Gaonkar ............. G06F 9/45558 718/1 |
| 2014/0244950 A1 * | 8/2014 | Baron et al. ................... 711/162 |
| 2015/0074054 A1 * | 3/2015 | Antony ............. G06F 17/30088 707/639 |

* cited by examiner

*Primary Examiner* — Wing F Chan
*Assistant Examiner* — Joseph Maniwang (57) ABSTRACT

A management server clones a source virtual machine to a plurality of target host computers. For each target host, the management server creates linked clones of the source virtual machine in a target data store that is accessible to the target host. The management server starts execution of the linked clones in the target hosts. While the linked clones execute, for each target host, the management server creates full clones of the source virtual machine in the target data store and, after creating the full clones, suspends execution in the linked clones and resumes execution in the full clones.

27 Claims, 6 Drawing Sheets

RAPID VIRTUAL MACHINE CLONING

BACKGROUND

A virtual machine (VM) is a software abstraction, or "virtualization," of an actual physical computer system. Each VM typically mimics the general structure of a physical computer and as such will usually have both virtual system hardware and guest system software. The virtual system hardware typically includes at least one virtual CPU, virtual memory, at least one storage device, such as a virtual disk, and one or more virtual devices. All of the virtual hardware components of the VM can be implemented in software to emulate corresponding physical components. The guest system software typically includes a guest operating system and drivers as needed.

Frequently, rather than creating a new virtual machine from scratch by allocating resources, loading and booting an operating system, and then loading and starting guest applications, system administrators find it useful to start up new operational virtual machines that are copies (or clones) of existing virtual machines that are already either running or powered off. To start up a virtual machine in this way, a process typically starts with the creation of a new virtual machine on a suitable host that is a copy of an existing source virtual machine. To clone the contents of an existing source virtual machine, a "snapshot" of the source machine file system is taken, typically with the aid of software residing on the source machine. The snapshot provides an image of the complete state of the source machine file system at a moment in time. To clone a powered off virtual machine, a snapshot is not required.

In order for a new VM to be a copy of a source machine, it is cloned to storage associated with the new virtual machine. After cloning has been completed, the operating system of the new VM may be loaded and booted, and specific applications of the new VM may be loaded and started. There are many ways of performing this cloning operation. In a typical computing environment, the new VM is connected to the source machine over a network, and the data are transferred over that network. The VM storage can be local (such as all or a portion of a disk drive attached directly to the physical machine which hosts the VM), or it can be located remotely, for example, in a Storage Area Network (SAN) accessible from the VM. Regardless of the specific hardware and software details, the cloning operation can take a considerable amount of time. The amount of time will vary according to the implementation details, the resulting average data transfer rates, and the size of the source machine file system that must be transferred. For typical machines and networks in common use in 2008, the size of the source file system can be 50 GB or more, and typical average data transfer rates can be about 20 MB/s. Thus, a complete cloning operation can take at least 2500 seconds or about 40 minutes. Significantly longer times are not uncommon, especially for servers running data-intensive applications that can have much larger file systems.

While a cloning operation executes, the clone of the virtual machine that is being created cannot be started. Indeed, the virtual machine clone becomes usable only after the cloning operation completes. The delay from when a virtual machine clone is requested to the time the virtual machine is fully cloned can be costly in a production environment, where cloned deployments of virtual machines are requested frequently and often unexpectedly. In many environments, when a cloned virtual machine deployment is requested, there is often a need for the virtual machine clone to become operational almost immediately. Therefore, a need has arisen for a way of cloning virtual machines rapidly.

SUMMARY OF THE DISCLOSURE

An embodiment of the present disclosure provides for a method of rapidly cloning virtual machines in a plurality of hosts connected to a computer network. The plurality of hosts includes a source host computer and one or more target host computers, including a first target host. A source data store having a source virtual machine stored therein is accessible to the source host and the first target host. The method includes receiving a request to clone the source virtual machine to the first target host. The method further includes creating a first VMware linked clone of the source virtual machine in a first target data store that is accessible to the first target host, or to both the first target host and to the source host, and starting execution of the first linked clone on the first target host. In addition, the method includes, while the first linked clone executes, creating a first intermediate clone of the source virtual machine in the target data store. The method further includes, after creating the first full clone, suspending execution in the first linked clone, and updating the first intermediate clone based on a modified state of the first linked clone, where the updating transforms the first intermediate clone into a first full clone. The method further includes resuming execution in the first full clone.

In another embodiment of the present disclosure, a non-transitory computer readable storage medium stores computer readable program code for cloning virtual machines in a plurality of hosts connected to a computer network, wherein the plurality of hosts comprises a source host and a plurality of target hosts having a first target host, and wherein a source data store having a source virtual machine stored therein is accessible to the source host and the first target host. The computer readable program code includes computer readable program code to receive a request to clone the source virtual machine to the first target host and computer readable program code to create a first linked clone of the source virtual machine in a first target data store connected that is accessible to the first target host, or to both the first target host and to the source host. The computer readable program code further includes computer readable program code to start execution of the first linked clone on the first target host. In addition, the computer readable program code includes computer readable program code to create a first intermediate clone of the source virtual machine in the first target data store while the first linked clone executes. The computer readable program code further includes computer readable program code to suspend execution of the first linked clone and to update the first intermediate clone based on a modified state of the first linked clone, where the updating transforms the first intermediate clone into a first full clone. The computer readable program code also includes computer readable program code to resume execution in the first full clone.

Another embodiment of the present disclosure provides a virtualized computing system. The virtualized computing system includes a plurality of hosts having a source host and a plurality of target hosts that includes a first target host. The virtualized computing system also includes a source data store accessible to the source host and the first target host, where a source virtual machine is stored therein. Further, the virtualized computing system includes a management server configured to manage the cloning of virtual machines to the plurality of hosts. The management server is configured to receive a request to clone the source virtual machine to the first target host, to create a first linked clone of the source virtual machine on a first target data store that is accessible to the first target host, or to both the first target host and to the source host, and to start execution of the first linked clone on the first target host. The management server is further configured to create a first intermediate clone of the source virtual machine on the first target data store while the first linked clone executes. In addition, the management server is configured to suspend execution in the first linked clone and update the first intermediate clone based on a modified state of the first linked clone, where the updating transforms the first intermediate clone into a first full clone. The management server is further configured to resume execution in the first full clone.

DETAILED DESCRIPTION

Figure 1:
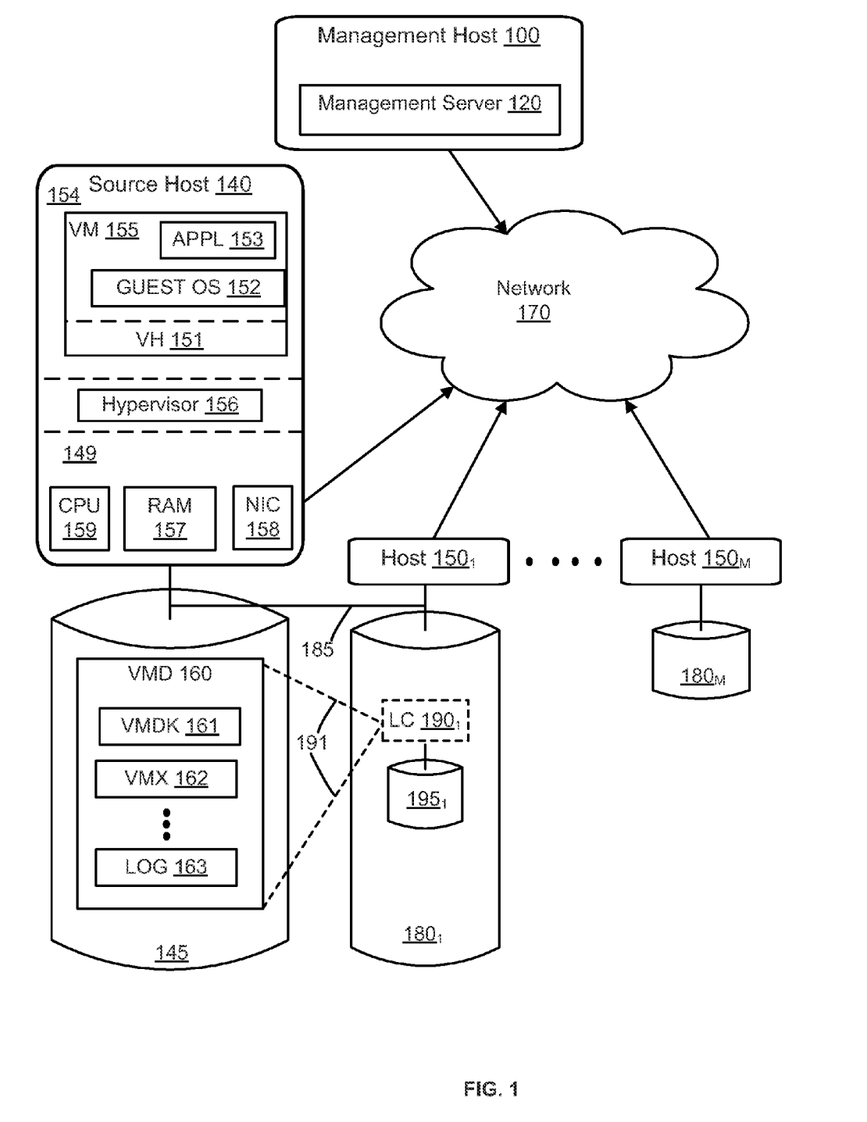
FIG. 1 is a block diagram that depicts a computer network comprising a management host, a source host, and target hosts in which embodiments may be implemented.

FIG. 1 depicts a plurality of hosts, including a management host 100, a source host 140, and target hosts $150_{1-N}$, which are connected to network 170. The hosts may be desktop computers, laptops, or server grade computers and are each capable of implementing a virtualized system architecture. Referring to FIG. 1, source host 140 is representative of hosts connected to network 170. Source host 140 includes a physical hardware platform 149, a hypervisor 156, and a virtual machine (VM) execution space 154 in which one or more VMs may run. Physical hardware platform 149 is comprised of one or more CPUs 159, a random access memory (RAM) 157, and a network interface control (NIC) 158. Hardware platform 149 may implement any of a number of computer architectures, such as the x86 architecture.

As shown in FIG. 1, source host 140 is connected to a physical data store 145. In some embodiments, data store 145 may be a single disk-storage medium. Data store 145 may also be a SCSI, Fibre Channel, or iSCSI storage array. Storage arrays may be of any type such as a network-attached storage (NAS) filer or a block-based device over a storage area network (SAN). Further, data stores $180_{1-N}$, each of which is connected to a host $150_{1-N}$, may also be any of the aforementioned storage types. In addition, in some embodiments, any of data stores 180 may be dedicated to a single host 150 or may be shared among two or more hosts 150 or with source host 140.

Network 170 may be any type of network that enables communication among a plurality of host computers. In embodiments, network 170 may be a local area network, such as token ring or Ethernet; a campus- or metropolitan-area network, which may entail interconnecting one or more smaller sub-networks; or a wide area network, such as the Internet. Data transmission over network 170 may occur over different types of physical media, including optical fiber, coaxial cable, or twisted pair. Further, data transmission on network 170 may occur using a variety of network protocols, including TCP/IP, IEEE 802.3, SDLC, or other protocols. Network 170 may also comprise a wireless network that supports a wireless communication standard (e.g., WiFi). Other network configurations are envisaged for network 170.

FIG. 1 also depicts hypervisor 156, which is software that manages the hardware and CPU resources encapsulated in hardware platform 149, and which enables the execution of one or more VMs 155 in VM execution space 154. One example of hypervisor 156 is included as a component of VMware's vSphere™ product, which is commercially available from VMware, Inc. of Palo Alto, Calif. It should be recognized that other virtualized computer systems are contemplated, such as hosted virtual machine systems, where the hypervisor is implemented in conjunction with a host operating system.

As shown in FIG. 1, VM 155 runs in VM execution space 154. In general, a VM is a software implementation of a physical computer. A VM implements a virtual hardware platform that supports the installation of a guest operating system which is capable of executing applications. Examples of a guest operating system include any of the well-known commodity operating systems, such as Microsoft Windows™, Linux™, and the like. As shown in FIG. 1, VM 155 includes virtual hardware platform 151, guest operating system (OS) 152, and one or more guest applications 153. In addition, embodiments disclosed herein may include VMs that are: virtual appliances, which are VMs that run a pre-installed operating system and are configured with applications that are optimized to provide a specific set of services; or vApps, which are collections of VMs that work together as a single unified application.

Further, the state of VM 155 (e.g., the contents of virtual memory, the contents of virtual disk storage, and the execution state of virtual CPUs) is stored in a plurality of virtual machine data files 160 (referred to hereinafter as VMD 160), which is stored in data store 145. Data files comprising VMD 160 include, for example, a virtual machine disk (or VMDK) 161, which stores the data of a virtual disk, a VM configuration file (or VMX) 162, which stores configuration data and settings for VM 155, and log 163, which is an activity log for VM 155 that can be useful for troubleshooting. Other data files are included in VMD 160, all of which fully describe the current state of VM 155.

FIG. 1 also depicts a management host 100, wherein a management server 120 executes. As is the case for hosts $150_{1-M}$, management host 100 may be a desktop, laptop, or server grade computer capable of implementing a virtualized system architecture. Management server 120 is a computer program that serves as a single point of control for hosts connected to network 170. Management server 120 may reside and execute in a central server, as is shown in FIG. 1, or, in other embodiments, management server 120 may reside and execute in a VM on source host 140 or any of hosts $150_{1-M}$. Management server 120 maintains communication with source host 140 and each of hosts $150_{1-M}$, and carries out administrative tasks such as load balancing between hosts and workload balancing between data stores.

In FIG. 1, management server 120 also manages the deployment (or "cloning") of VMs to hosts $150_{1-M}$. VM cloning entails: (1) receiving a request to provide a number of VMs to run on one or more hosts 150, wherein multiple VMs may be provided to a single host 150; (2) accessing data files stored in VMD 160 for a particular virtual machine, called a "source" VM, which resides on (and may execute on) source host 140; (3) transmitting copies of VMD 160 to hosts 150 that are to be provided VMs; and (4) storing the transmitted copies of VMD 160 to respective data stores 180$_{1-M}$ associated with each of hosts 150$_{1-M}$. After these steps are completed for a particular host 150, a VM is "cloned" (or deployed) on that host 150. Once a VM is cloned on a host 150, the VM may then be started on that host. After the VM is started and begins executing, the data contained in the copied versions of VMD 160 comprises the current state of the newly started VM.

Cloning VMs can be time consuming. Large computing environments (such as datacenters for large organizations) often require VMs to be deployed to a large number of end users. Prior to using a deployed, or cloned, VM, an end user must wait until that VM is "fully cloned" on a host. Specifically, the user must wait for all data files associated with source file set VMD 160 to be stored on a data store 180 connected to a target host 150 before the cloned VM can be used on that target host 150. If network 170 is busy, or if a source VMD 160 consists of a large amount of data, cloning may take longer than desired. Therefore, end users who have an urgent need to use a cloned VM will be delayed.

To address this drawback, management server 120 supports fully cloning VMs rapidly. Management server 120 enables an end user to begin using a cloned VM almost immediately after a cloning request is made. In order to achieve this, management server 120 uses linked clones. Linked cloning is a technology that is included with VMware's vSphere® product suite. A linked clone is a copy of a source VM that reads virtual disks of a source VM, while maintaining its own disk and memory changes (e.g., write operations to files) on a local virtual disk, which is called a "delta disk." A linked clone is created by taking a snapshot of a source VM, where the snapshot preserves the state and data of the source VM at a point in time. The state of the source VM includes the power state (e.g., whether the VM is powered on, powered off, or suspended), as well as all components that comprise the source VM, such as virtual disks, virtual memory, and virtual devices. When a snapshot of a source VM is created, a collection of files associated with each virtual disk of the source VM is created. These files (referred to as "child disks", "redo logs", or "delta links"), capture changes made to virtual disks of the source VM from the time the snapshot is taken. Thus, the child disks, combined with the virtual disk files in use prior to the snapshot, can be used to capture all changes made to virtual disks of the source VM.

When a snapshot of a source VM is taken in order to create a linked clone, all files of the source VM at the time of the snapshot are accessible to the linked clone. Because any disk changes (e.g., file writes) made by the linked clone are saved in a delta disk (or child disk), those changes have no effect on the source VM. In like manner, the cloned VM accesses a snapshot of the source VM, and any disk changes made after the time of the snapshot by the source VM have no effect on the linked clone.

In order to execute, a linked clone accesses the data store on which the original virtual disk files of the source VM are saved. Indeed, a linked clone that does not have access to the virtual disk files of the source VM is disabled. Further, linked clones are created quickly, as they do not require copying the full current state of a source VM to a target VM; a linked clone uses the snapshot of the source VM taken at the time the linked clone is created. Linked cloning also conserves disk space by allowing multiple deployed VMs (i.e., linked clones) to access and use the same software installed on the source VM.

Referring to FIG. 1, linked clone (LC) 190$_1$ is deployed to host 150$_1$ from source host 140, and is depicted as "stored" in data store 180$_1$. However, linked clones access a snapshot of the virtual disks of the source VM. Accordingly, LC 190$_1$ is depicted as associated with VMD 160, which consists of the files that make up the current state of VM 155. This is depicted by the dashed lines 191 from LC 190$_1$ to VMD 160. Further, disk changes by a linked clone are captured in a local "delta disk" (DD) 195$_1$, which is connected to LC 190$_1$. Finally, in order for host 150 to execute LC 190$_1$, host 150 accesses the data store that VMD 160 is stored on. Thus, as shown in FIG. 1, data store 180$_1$ and data store 145 are accessible to host 150.

In contrast to a linked clone, a full clone of a source VM is a complete copy of a source VM that runs independent of the source VM. That is, after a source VM is fully cloned on a host computer, the fully cloned VM does not access any of the source VM files. In some respects, full clones have advantages over linked clones because full clones do not require a persistent connection to the source VM files, whereas, as previously mentioned, a linked clone that is not connected to the source VM files is disabled. In addition, the overall execution performance of a full clone tends to be superior to that of a linked clone because full clones do not incur the overhead involved with accessing the virtual disk files of a source VM. Therefore, end users may desire fully cloned VMs because of their performance advantages.

Figure 2:
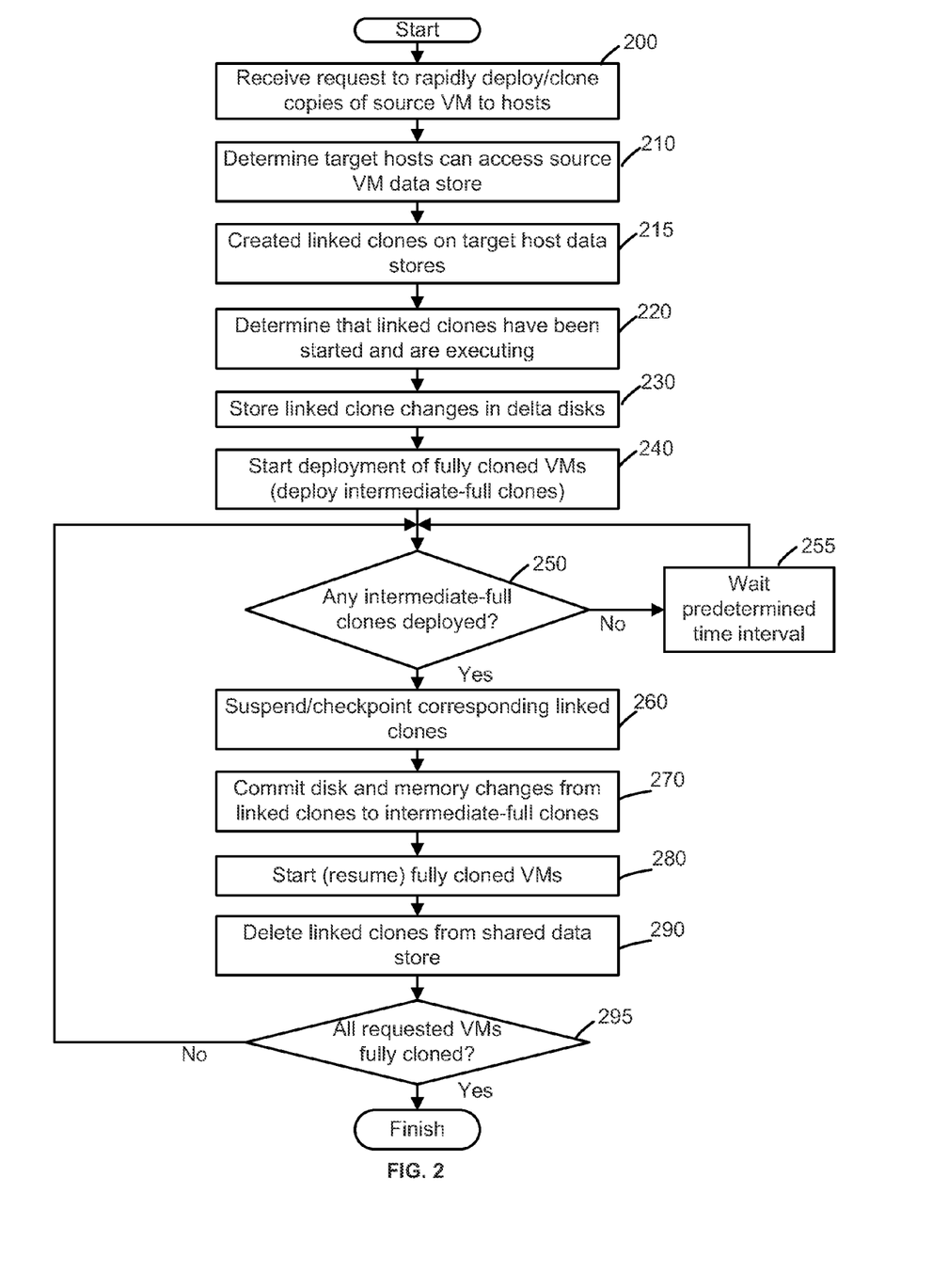
FIG. 2 is a flow diagram that illustrates the steps carried out by a management server to rapidly deploy full clones of virtual machines to hosts connected to a computer network.

As stated earlier, management server 120 enables the rapid deployment of fully cloned VMs by using linked clones. FIG. 2 illustrates the steps carried out by an embodiment in order to rapidly clone one or more fully cloned VMs. At step 200, management server 120 receives a request to rapidly deploy a source VM to one or more hosts 150 connected to network 170. The request may be received from a system administrator or end user, and the request may be generated in a number of ways, such as via an application user interface, a web browser, a database entry, an e-mail request, a file, or any way in which input can be provided to a computer program. In some embodiments, the request includes: source host 140, source VM 155, source data store 145, source file set VMD 160, and one or more target hosts 150. Other embodiments may include in the request, along with the aforementioned data, one or more data stores 180 on which copies of VMD 160 are to be deployed.

At step 210, management server 120 determines that one or more of hosts 150 have access to source data store 145. For example, host 150 may be connected to a data store 180 that shares a data channel with source data store 145. In such a case, data stores 145 and 180 are referred to as "shared" data stores because they are accessible from both source host 140 and one or more hosts 150. As mentioned earlier, linked clones can only be deployed to hosts that can access a source data store (i.e., data store 145 depicted in FIG. 1). After determining the set of hosts 150 that have access to source data store 145, management server 120, at step 215, deploys linked clones (LCs) 190 to hosts 150 by storing LCs 190 on shared (or local) data stores 180 connected to hosts 150. In addition management server 120 creates a DD 195 for each deployed LC. Further, management server 120 may also create LCs 190 directly on source data store 145 if, for example, the request received at step 200 specifies LCs 190 are to be deployed on source data store 145.

At step 220, management server 120 determines that one or more of LCs 190 that are rapidly cloned at step 215 are started and in execution. For those LCs 190 that are in execution, management server 120, at step 230, captures the updates made by those executing LCs 190 to their local virtual disks, or DDs 195.

At step 240, management server 120 starts deploying "intermediate" VM clones to data stores 180 specified in the request at step 200. As previously stated, deployment of a full clone entails copying the full state of a source VM (which is stored in VMD 160) to data store 180 of a target host 150. Source VMD 160, which is used as the source for deployment of full clones and is equivalent, from a data standpoint, to the snapshot used in the deployment of LCs 190 at step 215. Once VMD 160 is copied to data store 180, the VM clone deployed to data store 180 is referred to as an "intermediate" clone because the state of the deployed VM clone reflects the state of the source VM at the time the snapshot is taken. State changes that occur after the snapshot is taken, which are captured in DDs 195, are not yet reflected in the state of the VM clone deployed to data store 180.

At step 250, management server 120 determines whether any VMs that were requested to be rapidly cloned at step 200 have been deployed as intermediate clones to any target host 150. If management server 120 determines that no intermediate clones have been deployed, management server 120 then, at step 255, waits for a predetermined time interval. The predetermined time interval may be configured by an administrator. Once the predetermined time interval expires at step 255, the process depicted in FIG. 2 returns to step 250 to once again determine whether any intermediate clones are deployed.

When management server 120 determines, at step 250, that one or more intermediate clones are deployed, management server 120 then proceeds to transfer processing from each LC 190 to a corresponding fully cloned VM. Embodiments of management server 120 carry out this task through a mechanism referred to as suspend/resume.

In general, the process of suspending a VM is also referred to as checkpointing, and is described in U.S. Pat. No. 6,795,966, which is incorporated by reference herein in its entirety. During the VM suspend process, a file (known as a checkpoint file) is created on a data store and the state of the VM, including its memory and CPU state, is stored in the file. During VM resume, this same file is loaded into memory to restore the state of the VM. With a shared storage device, it is possible to resume the VM on a different host than where the VM was suspended.

Referring to FIG. 2, management server 120, at step 260, suspends LCs 190 deployed at step 215. At this point, the memory and CPU state of suspended LCs 190 are saved to DDs 195. Next, at step 270, management server 120, for each LC 190, applies the changes that LC 190 has made to corresponding DD 195 to the virtual disks of the intermediate clone of the VM that corresponds to LC 190. Further, the memory and CPU state of suspended LC 190 is applied to the intermediate clone of the VM that corresponds to LC 190. After the disk, CPU, and memory state changes are applied (or "committed") to the intermediate clones, the intermediate clones are fully cloned VMs and are ready to be used. At step 280, the fully cloned VMs are started (or resumed). From the standpoint of an end user who was working with a particular LC 190, the starting of a fully cloned VM is simply a resume operation: the end user may perceive a short pause of the VM (i.e., the suspension of LC 190) and then, after changes from DD 195 and from the checkpoint file are applied to the fully cloned VM, a resumption of the VM (i.e., the starting of the fully cloned VM). In embodiments, the suspend/resume process happens quickly and seamlessly so as to allow an end user to work with a VM practically uninterrupted. That is, the end user who works with LC 190 perceives a short pause of LC 190 and then, upon the starting of the fully cloned VM, continues working with what the end user perceives as the same VM.

At step 290, after the fully cloned VMs are started, management server 120 deletes corresponding LCs 190 and DDs 195 from data stores 180 connected to hosts 150 because they are no longer needed.

At step 295, management server 120 determines whether all VMs that were requested to be rapidly cloned at step 200 have in fact been fully cloned to each requested host 150. If all VMs that were requested to be rapidly cloned at step 200 have not been fully cloned, then the process depicted in FIG. 2 returns to step 250 to once again determine whether any additional intermediate clones are deployed. If all VMs have been fully cloned to each requested host 150, then the process terminates.

Figure 3A:
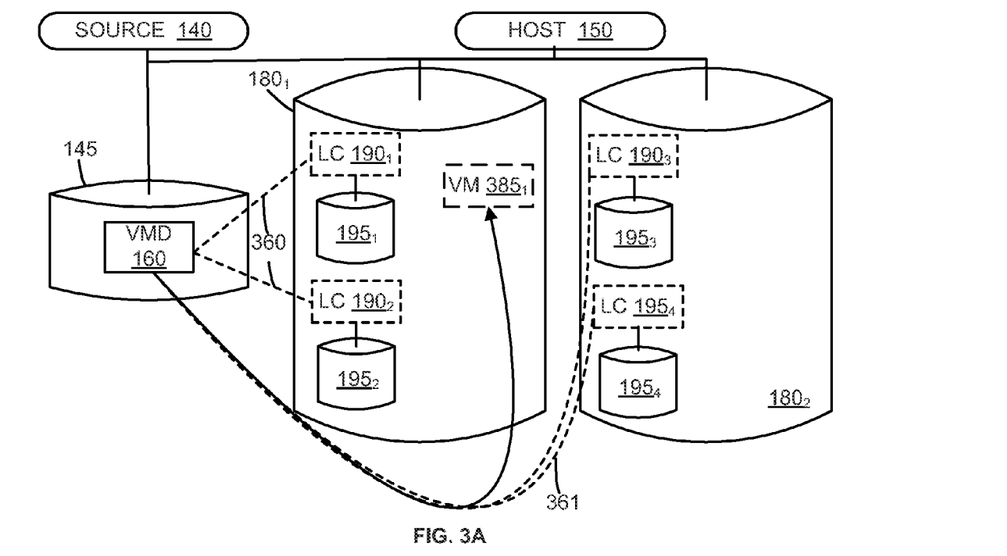
FIGS. 3A, 3B, 3C, and 3D are block diagrams that depict the steps carried out by a management server to rapidly deploy full clones of virtual machines from a source host to a target host, where source and target hosts are connected to shared storage.

FIGS. 3A, 3B, 3C, and 3D are block diagrams that depict the steps carried out by management server 120 to rapidly deploy full clones of virtual machines from a source host to a target host, where source and target hosts are connected to a shared data store. Specifically, four fully cloned VMs are rapidly deployed, where two fully cloned VMs are deployed to each of two shared data stores. As shown in FIG. 3A, source 140 is connected to a data store 145, which stores data files VMD 160 that comprise the current state of a VM 155 (not shown). Host 150 is also connected to data store 145. Further, source host 140 and host 150 are each connected to shared data stores 180$_1$ and 180$_2$. Management server 120 deploys linked clones LCs 190$_1$ and 190$_2$ to data store 180$_1$, and linked clones 190$_3$ and 190$_4$ to data store 180$_2$. Host 150 runs each of LCs 190$_{1-4}$ by accessing VMD 160, which is depicted by dotted lines 360 and 361. Further, each of LCs 190$_{1-4}$ is associated with a DD 195$_{1-4}$. After LCs 190$_{1-4}$ are deployed, management server 120 starts to deploy a VM clone 385$_1$ as an intermediate clone to data store 180$_1$. In FIG. 3A, and in all subsequent figures, VM clones 385 comprise copies of the files and data that describe the state of source VM 155 at the start of a cloning operation. Further, in FIG. 3A, and in all subsequent figures, VMs that have not yet been fully cloned are denoted by dashed lines.

Figure 3B:
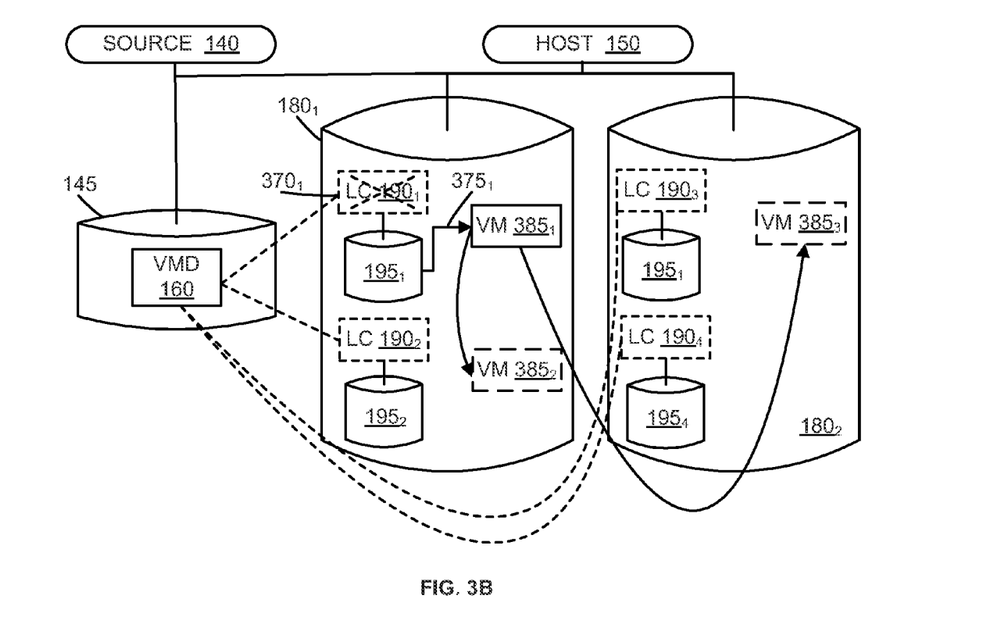

In FIG. 3B, VM clone 385$_1$ is an intermediate clone deployed on data store 180$_1$. Therefore, management server 120 performs a suspend/resume process on LC 190$_1$ and VM clone 385$_1$, whereby LC 190$_1$ is suspended, updates to DD 195$_1$ are applied to VM clone 385$_1$ (depicted by arrow 375$_1$), and VM clone 385$_1$ is resumed). Further, since LC 190$_1$ is no longer required after VM clone 385$_1$ is resumed, management server 120 may delete LC 190$_1$ from data store 180$_1$, as is shown by the cross at 370$_1$.

Further, in FIG. 3B, management server 120 continues deployment of fully cloned VMs by initiating localized cloning of VM clone 385$_2$ on data store 180$_1$, and by initiating cloning of VM clone 385$_3$ on data store 180$_2$ from intermediate VM clone 385$_1$. In embodiments, management server 120 initiates localized full cloning prior to updating VM clone 385$_1$ from DD 195$_1$. Once deployed, both VM clone 385$_2$ and VM clone 385$_3$ are intermediate clones of VM clone 385$_1$. Localized cloning involves creating additional clones of a VM on a data store by using an already-cloned VM on the data store. Embodiments of management server 120 perform localized cloning instead of repeatedly copying a source VMD 160 from source data store 145 to a target data store 180 because such copying may suffer from latency in the data channel connecting source data stores 145 and another data store 180.

Figure 3C:
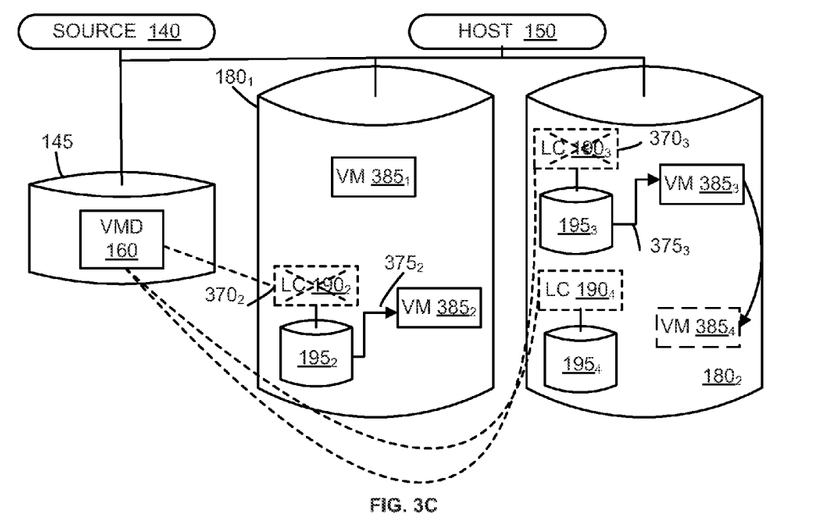

In FIG. 3C, VM clone $385_2$ is an intermediate clone deployed on data store $180_1$. Therefore, management server 120 performs a suspend/resume process on LC $190_2$ and VM clone $385_2$ by: (1) suspending LC $190_2$; (2) applying changes stored in DD $195_2$ to VM clone $385_2$, as shown by arrow $375_2$; and (3) resuming VM clone $385_2$. Management server 120 then deletes LC $190_2$, as shown by $370_2$, because LC $190_2$ is no longer required.

Still referring to FIG. 3C, VM clone $385_3$ is an intermediate clone deployed to data store $180_2$. Therefore, management server 120 performs a similar suspend/resume process on LC $190_3$ and VM clone $385_3$ by suspending LC $190_3$, applying changes made in DD $195_3$ to VM clone $385_3$ (denoted by arrow $375_3$), resuming VM clone $385_3$, and deleting LC $190_3$, denoted by the cross at $370_3$. Further, management server 120, before committing changes from LC $190_3$ to VM $385_3$, initiates localized cloning of VM clone $385_3$ to VM clone $385_4$ because two cloned VMs are deployed to each data store $180_{1-2}$ and, as mentioned earlier, embodiments of management server 120 perform localized cloning on a data store that already has a first cloned VM stored therein.

Figure 3D:
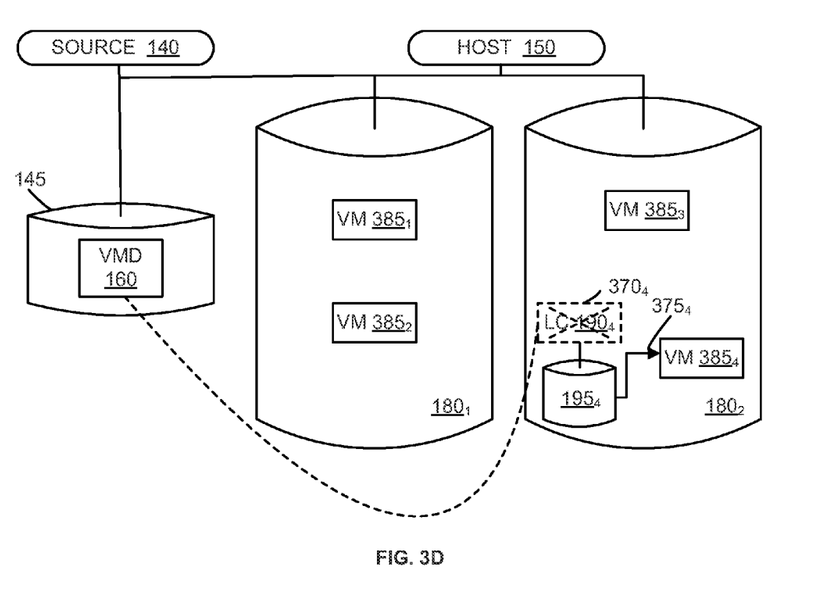

Finally, as shown in FIG. 3D, VM clone $385_4$ is an intermediate clone deployed on data store $180_2$. Accordingly, management server 120 suspends LC $190_4$, applies changes made in DD $195_4$ to VM clone $385_4$, denoted by arrow $375_4$, resumes VM clone $385_4$, and deletes LC $190_4$, denoted by the cross shown at $370_4$.

In some embodiments, a host 150 may be connected to multiple data stores 180, some of which are accessible by source host 140 and some of which are not accessible by source host 140. Put another way, there may not exist a data channel between source 140 and some data stores 180 connected to a host 150. Data stores that are only accessible from the host to which they are attached are referred to as "local data stores." However, the need to rapidly deploy fully cloned VMs to a local data store may still arise. Some embodiments of management server 120 support the rapid deployment of fully cloned VMs to local data stores by deploying linked clones to target host local data stores only in cases where a source VM is stored in a source data store that is also accessible to the target host.

Figure 4A:
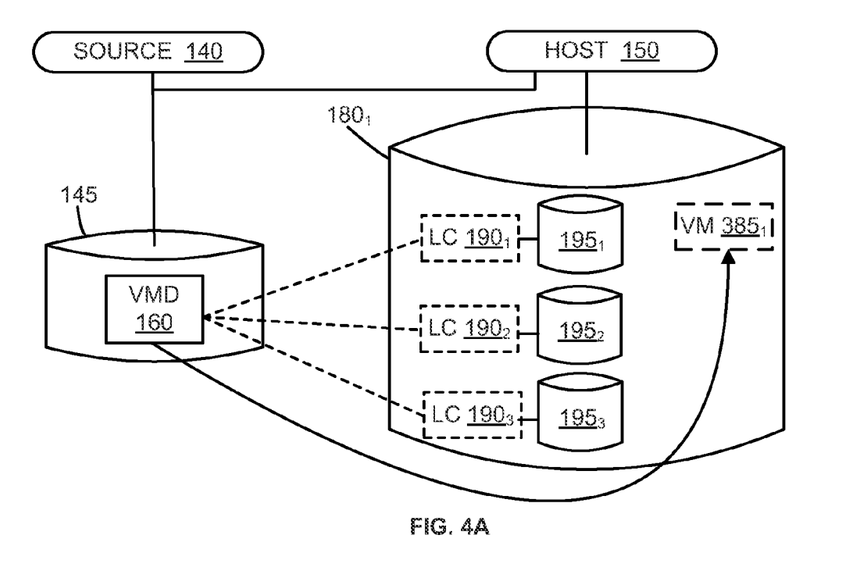
FIGS. 4A, 4B, and 4C are block diagrams that depict the steps carried out by a management server to rapidly deploy full clones of virtual machines from a source host to a local storage of a target host.
Figure 4B:
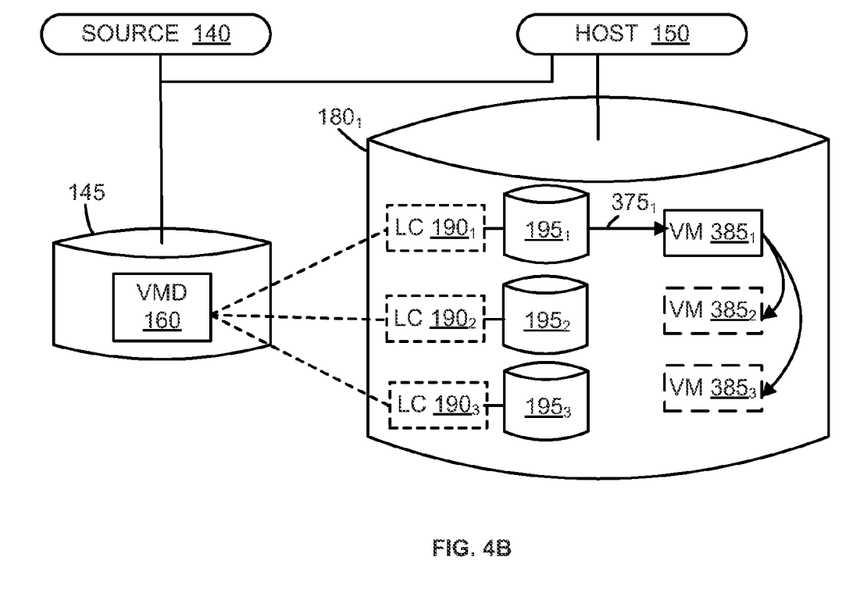
Figure 4C:
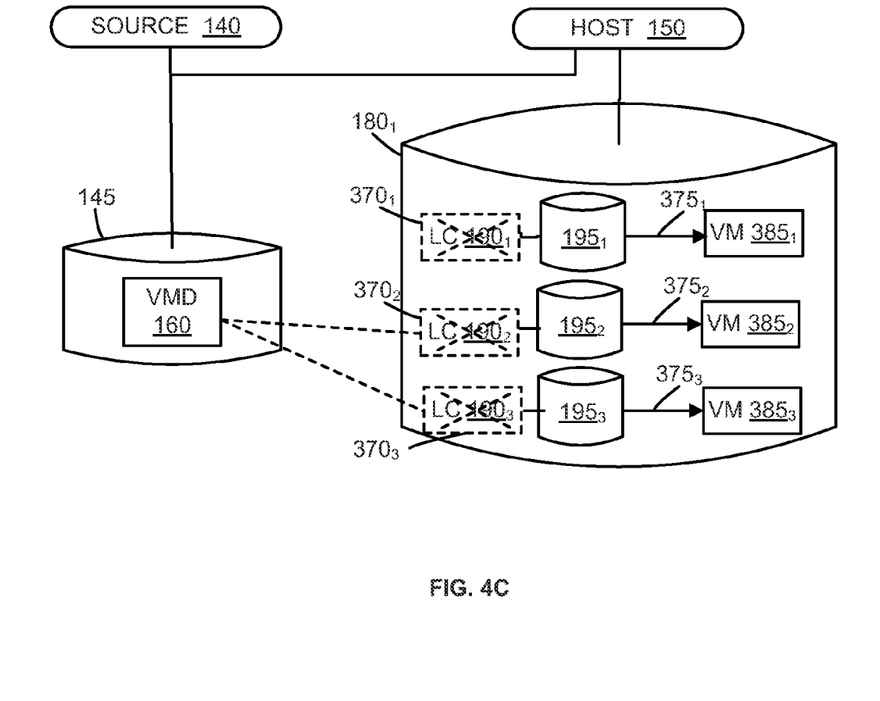

FIGS. 4A, 4B, and 4C are block diagrams that depict the steps carried out by management server 120 to rapidly deploy full clones of virtual machines from a source host to a target host, where the source host and the target host are connected to shared storage, and where the target host is also connected to a local storage device. Specifically, management server 120 rapidly deploys three fully cloned VMs to the local data store connected to the target host. Such a deployment may be requested by an administrator or end user because a target data store may be a component of a deployment request received at step 200 of FIG. 2. Referring to FIG. 4A, source host 140 and host 150 are both connected to data store 145. Data store 145 stores VMD 160, which contains the files corresponding to the current state of source VM 155 (not shown). Host 150 is also connected to local data store $180_1$, which, as shown in FIG. 4A, is not accessible by source 140.

First, management server 120 rapidly deploys three linked clones (LCs) $190_1$, $190_2$, and $190_3$ to host 150 and stores these LCs on data store $180_1$. This deployment of LCs $190_{1-3}$ is possible because data store 145 is accessible to both source host 140 and to host 150. Further, each linked clones $190_{1-3}$ has an associated DD $195_{1-3}$, which are also stored on data store $180_1$. After deploying LCs $190_{1-3}$ and DDs $195_{1-3}$, management server 120 starts to deploy VM clone $385_1$ to local data store $180_1$, which is the data store on which full VM clones are requested to be deployed.

FIG. 4B, management server 120 initiates further deployments of fully cloned VMs on data store $180_1$ by copying intermediate VM clone $385_1$ to VM clones $385_{2-3}$, which are also deployed on data store $180_1$. As mentioned earlier, management server 120 performs "localized" deployments in order to overcome network latency.

Finally, as depicted in FIG. 4C, VM clones $385_{2-3}$ are intermediate VM clones of intermediate VM clone $385_1$ and deployed on data store $180_{14}$. At this point management server 120 suspends LCs $190_{1-3}$ and applies any changes in DDs $195_{1-3}$ to VM clones $385_{1-3}$, where the changes to DDs $195_{1-3}$ have occurred during the process of cloning VM clones $385_{1-3}$. The application of the changes to DDs $195_{1-3}$ is depicted in FIG. 4C for each VM clone $385_{1-3}$, respectively, by arrows $375_{1-3}$. Once the changes from DDs $195_{1-3}$ are applied to VM clones $385_{1-3}$, intermediate VM clones $385_{1-3}$ are transformed to full clones and are started (or, from the standpoint of the end user, VM clones $385_{1-3}$ are "resumed"). After VM clones $385_{1-3}$ are started, LCs $190_{1-3}$ are deleted from data store $180_1$ because they are no longer needed. The deletions of LCs $190_{1-3}$ are depicted in FIG. 4C, respectively, by the crosses $370_{1-3}$.

Although one or more embodiments have been described herein in some detail for clarity of understanding, it should be recognized that certain changes and modifications may be made without departing from the spirit of the disclosure. For example, in some embodiments, the transfer of processing from a linked clone LC 190 to a corresponding fully cloned VM utilizes a technique referred to as "fast suspend/resume." With fast suspend/resume, a linked clone stores changes to virtual disks in DD 195. However, instead of storing changes to the virtual memory of the linked clone in DD 195, and then restoring the virtual memory changes to the full clone from DD 195, management server 120 maintains metadata for pages of virtual memory space allocated for the linked clone. The metadata includes pointers to the linked clone's memory. Management server 120 copies metadata for pages of virtual memory space allocated for the linked clone and uses the copied metadata as metadata for pages of virtual memory space allocated to the fully cloned VM when the fully cloned VM is started. This use of metadata results in a quicker suspend/resume process because the metadata can be orders of magnitude smaller than the actual memory data that the metadata represents.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of cloning virtual machines executing in a plurality of hosts connected to a computer network, wherein the plurality of hosts comprises a source host and a plurality of target hosts including a first target host, the method comprising:
   receiving a request to clone a source virtual machine to the first target host, wherein the source virtual machine is stored on a source data store that is accessible to the source host and the first target host;
   creating a first linked clone of the source virtual machine on a first target data store, wherein the first target data store is accessible to the first target host;
   starting execution of the first linked clone on the first target host; while the first linked clone is executing on the first target host, creating a first intermediate clone of the source virtual machine on the first target data store; and
   after creating the first intermediate clone:
      suspending execution in the first linked clone;
      updating the first intermediate clone based on a modified state of the first linked clone, wherein the updating transforms the first intermediate clone into a first full clone; and
      resuming execution in the first full clone.

2. The method of claim 1,
   wherein creating the first intermediate clone comprises copying virtual disks associated with the source virtual machine to the first target data store, and
   wherein an end user accesses the linked clone while said virtual disks associated with the source virtual machine are copied.

3. The method of claim 1, further comprising:
   after resuming execution in the first full clone, deleting the first linked clone.

4. The method of claim 3, further comprising:
   loading the modified state into the first intermediate clone, wherein the modified state is stored in a delta disk associated with the first linked clone; and
   after resuming execution in the first full clone, deleting the delta disk.

5. The method of claim 1, wherein the first linked clone includes a plurality of virtual devices including a virtual CPU, virtual I/O devices, virtual disks, and virtual memory, and the stored modified state does not include a state of the virtual memory.

6. The method of claim 5, wherein the updating of the first intermediate clone further comprises:
   copying metadata maintained for pages of virtual memory space allocated for the first linked clone; and
   using the copied metadata as metadata for pages of virtual memory space allocated for the first full clone.

7. The method of claim 1, wherein the first intermediate clone is created on a local data store accessible to the first target host, and wherein the local data store is not accessible to the source host.

8. The method of claim 1, further comprising:
   after creating the first intermediate clone, creating a second intermediate clone of the source virtual machine on the first target data store, wherein the second intermediate clone is copied from the first intermediate clone.

9. The method of claim 8, wherein the second intermediate clone is created on a second target data store that is accessible to the first target host.

10. A non-transitory computer readable storage medium having stored thereon computer readable program code for cloning virtual machines in a plurality of hosts connected to a computer network, wherein the plurality of hosts comprises a source host and a plurality of target hosts including a first target host, the computer readable program code comprising:
   computer readable program code to receive a request to clone a source virtual machine to the first target host, wherein the source virtual machine is stored on a source data store that is accessible to the source host and the first target host;
   computer readable program code to create a first linked clone of the source virtual machine on a first target data store, wherein the first target data store is accessible to the first target host;
   computer readable program code to start execution of the first linked clone of the source virtual machine on the first target host;
   computer readable program code to create a first intermediate clone of the source virtual machine on the first target data store while the first linked clone is executing on the first target host;

computer readable program code to suspend execution in the first linked clone;

computer readable program code to update the first intermediate clone based on a modified state of the first linked clone, wherein the updating transforms the first intermediate clone into a first full clone; and computer readable program code to resume execution in the first full clone.

11. The computer readable storage medium of claim 10, wherein creating the first intermediate clone comprises:

copying virtual disks associated with the source virtual machine to the first target data store, and wherein an end user accesses the linked clone while said virtual disks associated with the source virtual machine are copied.

12. The computer readable storage medium of claim 10, the computer readable program code further comprising:

computer readable program code to delete the first linked clone after resuming execution in the first full clone.

13. The computer readable storage medium of claim 12, wherein the computer readable program code further comprises:

computer readable program code to load the modified state into the first intermediate clone, wherein the modified state is stored in a delta disk associated with the first linked clone; and computer readable program code to delete the delta disk after resuming execution in the first full clone.

14. The computer readable storage medium of claim 10, wherein the first linked clone includes a plurality of virtual devices including a virtual CPU, virtual I/O devices, virtual disks, and virtual memory, and the stored modified state does not include a state of the virtual memory.

15. The computer readable storage medium of claim 14, the computer readable program code further comprising:

computer readable program code to copy metadata maintained for pages of virtual memory space allocated for the first linked clone and use the copied metadata as metadata for pages of virtual memory space allocated for the first full clone.

16. The computer readable storage medium of claim 10, wherein the first intermediate clone is created on a local data store accessible to the first target host, and wherein the local data store is not accessible to the source host.

17. The computer readable storage medium of claim 10, the computer readable program code further comprising:

computer readable program code to create a second intermediate clone of the source virtual machine on the first target data store after creation of the first intermediate clone, wherein the second intermediate clone is copied from the first intermediate clone.

18. The computer readable storage medium of claim 17, wherein the second intermediate clone is created on a second target data store that is accessible to the first target host.

19. A virtualized computing system, comprising:

a plurality of hosts including a source host and a plurality of target hosts including a first target host; and a management server configured to manage deployment of virtual machines to the plurality of target hosts, wherein the management server is configured to:

receive a request to clone a source virtual machine to the first target host, wherein the source virtual machine is stored on a source data store that is accessible to the source host and the first target host;

create a first linked clone of the source virtual machine on the first target data store;

start execution of the first linked clone of the source virtual machine on the first target host;

create a first intermediate clone of the source virtual machine on the first target data store while the first linked clone is executing on the first target host;

suspend execution in the first linked clone;

update the first intermediate clone based on a modified state of the first linked clone, wherein the updating transforms the first intermediate clone into a first full clone; and resume execution in the first full clone.

20. The system of claim 19, wherein creating the first intermediate clone comprises:

copying virtual disks associated with the source virtual machine to the first target data store, wherein an end user accesses the linked clone while said virtual disks associated with the source virtual machine are copied.

21. The system of claim 19, wherein the management server is further configured to delete the first linked clone after resuming execution in the first full clone.

22. The system of claim 21, wherein the management server is further configured to:

load the modified state into the first intermediate clone, wherein the modified state is stored in a delta disk associated with the first linked clone; and delete the delta disk after resuming execution in the first full clone.

23. The system of claim 19, wherein the first linked clone includes a plurality of virtual devices including a virtual CPU, virtual I/O devices, virtual disks, and virtual memory, and the stored modified state does not include a state of the virtual memory.

24. The system of claim 23, wherein the management server is further configured to:

copy metadata maintained for pages of virtual memory space allocated for the first linked clone and use the copied metadata as metadata for pages of virtual memory space allocated for the first full clone.

25. The system of claim 19, wherein the first intermediate clone is stored on a local data store accessible to the first target host, and wherein the local data store is not accessible to the source host computer.

26. The system of claim 19, wherein the management server is further configured to:

create a second intermediate clone of the source virtual machine on the first target data store, wherein the second intermediate clone is copied from the first intermediate clone.

27. The system of claim 26, wherein the second intermediate clone is created on a second target data store that is accessible to the first target host.

* * * * *